United States Patent
Arango et al.

(10) Patent No.: US 6,724,747 B1
(45) Date of Patent: Apr. 20, 2004

(54) METHOD AND SYSTEM FOR MEDIA CONNECTIVITY OVER A PACKET-BASED NETWORK

(75) Inventors: Mauricio Arango, Weston, FL (US); Louis Cahl, Edison, NJ (US); Michael J. Cook, Flemington, NJ (US); Thomas C. Ely, Bridgewater, NJ (US); Christian Huitema, New York, NY (US); Frederick Obrock, Scotch Plains, NJ (US); Darek A. Smyk, Piscataway, NJ (US)

(73) Assignee: Telcordia Technologies, Inc., A Corp. of Delaware, Morristown, NJ (US)

( * ) Notice: Subject to any disclaimer, the term of this patent is extended or adjusted under 35 U.S.C. 154(b) by 0 days.

(21) Appl. No.: 09/205,560

(22) Filed: Dec. 3, 1998

Related U.S. Application Data

(60) Provisional application No. 60/067,224, filed on Dec. 3, 1997.

(51) Int. Cl.[7] .................................................. H04J 12/26
(52) U.S. Cl. ....................................................... 370/352
(58) Field of Search ................................ 370/352, 389, 370/392, 383, 390, 393, 401, 468, 463, 493, 410

(56) References Cited

U.S. PATENT DOCUMENTS

| | | | |
|---|---|---|---|
| 4,656,624 A | | 4/1987 | Collins et al. ............... 370/60 |
| 4,949,373 A | | 8/1990 | Baker, Jr. et al. ............ 379/96 |
| 5,282,244 A | * | 1/1994 | Fuller et al. ............ 379/114.28 |
| 5,329,619 A | | 7/1994 | Page et al. .................. 395/200 |
| 5,384,840 A | * | 1/1995 | Blatchford et al. ....... 379/221.1 |
| 5,550,906 A | | 8/1996 | Chan et al. .................. 379/207 |
| 5,581,596 A | | 12/1996 | Hogan ........................... 379/59 |
| 5,706,286 A | | 1/1998 | Reiman et al. ............. 370/401 |
| 5,757,895 A | * | 5/1998 | Aridas et al. ........... 379/114.28 |
| 5,764,750 A | | 6/1998 | Chan et al. .................. 379/229 |
| 5,799,317 A | * | 8/1998 | He et al. ..................... 370/410 |
| 5,822,420 A | * | 10/1998 | Bolon et al. ................ 370/431 |
| 5,848,069 A | * | 12/1998 | Milne et al. ................ 370/426 |
| 5,987,102 A | * | 11/1999 | Elliott et al. ........... 379/265.09 |
| 5,999,525 A | * | 12/1999 | Krishnaswamy et al. ... 370/352 |
| 5,999,965 A | * | 12/1999 | Kelly .......................... 709/202 |
| 6,026,087 A | * | 2/2000 | Mirashrafi et al. .......... 370/352 |
| 6,081,591 A | * | 6/2000 | Skoog ......................... 370/401 |
| 6,188,760 B1 | * | 2/2001 | Oran et al. ................. 379/229 |
| 6,229,803 B1 | * | 5/2001 | Bog et al. ................... 370/352 |
| 6,407,997 B1 | * | 6/2002 | DeNap et al. .............. 370/352 |

* cited by examiner

Primary Examiner—Wellington Chin
Assistant Examiner—William Schultz
(74) Attorney, Agent, or Firm—Bell Communications Research Inc.

(57) ABSTRACT

Methods and systems for a distributed scalable hardware independent system that supports multiple functions regarding management and support of communications over a packet-based network. The communications supported by these methods and systems include, but are not limited to, Voice Over Internet Protocol ("VOIP"), voice over Asynchronous Transfer Mode ("ATM"), video conferencing, data transfer, telephony, and downloading video or other data. These methods and systems use a call agent, which is composed of various objects distributed along a CORBA software bus, for exercising call management over two endpoints communicating over a packet-based network.

12 Claims, 15 Drawing Sheets

METHOD AND SYSTEM FOR MEDIA CONNECTIVITY OVER A PACKET-BASED NETWORK

CROSS-REFERENCE TO RELATED APPLICATIONS

This application claims the benefit of U.S. Provisional Application No. 60/067,224, filed Dec. 3, 1997, the contents of which are hereby incorporated by reference.

BACKGROUND OF THE INVENTION

The present invention relates generally to communications, and more particularly, to a method and system for managing media sessions.

The telecommunications industry is pushing to develop effective systems for implementing voice-based communications over packet-based networks, particularly voice over Internet Protocol ("IP"). The H.323 protocol standards represent one such attempt, but suffer from several disadvantages. In particular, these standards require a logical data connection between network elements, which limits flexibility, scalability, and efficiency.

Therefore, it is desirable to have a method and system for overcoming the disadvantages of conventional voice over packet-based network systems.

DESCRIPTION OF THE INVENTION

Accordingly, the present invention is directed to a communication system that substantially obviates one or more of the problems due to limitations and disadvantages of the prior art.

In accordance with the purposes of the invention, as embodied and broadly described herein, the invention comprises a packet-based network, a first subscriber unit, a first media control device connecting the first subscriber unit to the packet-based network, a second subscriber unit, a second media control device connecting the second subscriber unit to the packet-based network, and a call agent. The call agent of this embodiment is a device for managing communications between the first and second subscriber units over the network, and a device for sending and/or receiving SS7 signaling information.

In another aspect, the invention comprises a first subscriber unit coupled to a network through a first media control device, a second subscriber unit coupled to the network through a second media control device, and a call agent. The call agent of this embodiment includes a first call agent cluster coupled to the first subscriber unit through a media control device. The first call agent cluster includes a device for translating information received from the first media control device in a first protocol into a common protocol, a device for communicating with a second call agent cluster using the common protocol, a device for translating the information in the common protocol into the first protocol, and a device for controlling the first media control device for managing a media session between the first subscriber unit and the second subscriber unit over the network.

In another aspect, the invention comprises a method of managing communications between a first subscriber unit and a second subscriber unit over a network, wherein this method includes the call agent sending and/or receiving SS7 signaling information regarding management of communications over a packet-based network, the call agent managing communications between the first and second subscriber units over the network, and the first and second subscriber units communicating over the network.

In another aspect, the invention comprises a method of managing communications between a first subscriber unit and a second subscriber unit. This method comprises the steps of a first media control device coupled to the first subscriber unit transmitting information in a first protocol to a first call agent cluster regarding establishing a media session with the second subscriber unit over a packet-based network. The first call agent cluster translates the information in the first protocol to a common protocol and sets up a connection between the first call agent cluster and a second call agent cluster. The first call agent cluster and the second call agent cluster exchange information using the common protocol, the first call agent cluster translating information in the common protocol to the first protocol. The first call agent cluster transmits the information in the first protocol to the first media control device coupled to the first subscriber unit. The second call agent cluster translates information in the common protocol to a second protocol, and transmits the information in the second protocol to a second media control device coupled to the second subscriber unit. The first subscriber unit and the second subscriber unit then exchange information over the network.

The description of the invention and the following description for carrying out the best mode of the invention should not restrict the scope of the claimed invention. Both provide examples and explanations to enable others to practice the invention. The accompanying drawings, which form part of the description for carrying out the best mode of the invention, show several embodiments of the invention, and together with the description, explain the principles of the invention.

BEST MODE FOR CARRYING OUT THE INVENTION

Reference will now be made in detail to the preferred embodiments of the invention, examples of which are illustrated in the accompanying drawings. Wherever possible, the same reference numbers will be used throughout the drawings to refer to the same or like parts.

In a preferred embodiment of the invention, an Internet Gateway Call Server ("IGCS") is a distributed scalable hardware independent system that supports multiple functions regarding management and support of communications over a packet-based network. The communications supported by the IGCS include, but are not limited to, Voice Over Internet Protocol ("VOIP"), voice over Asynchronous Transfer Mode ("ATM"), video conferencing, data transfer, telephony, and downloading video or other data. These communications will be referred to as media sessions.

Figure 1:
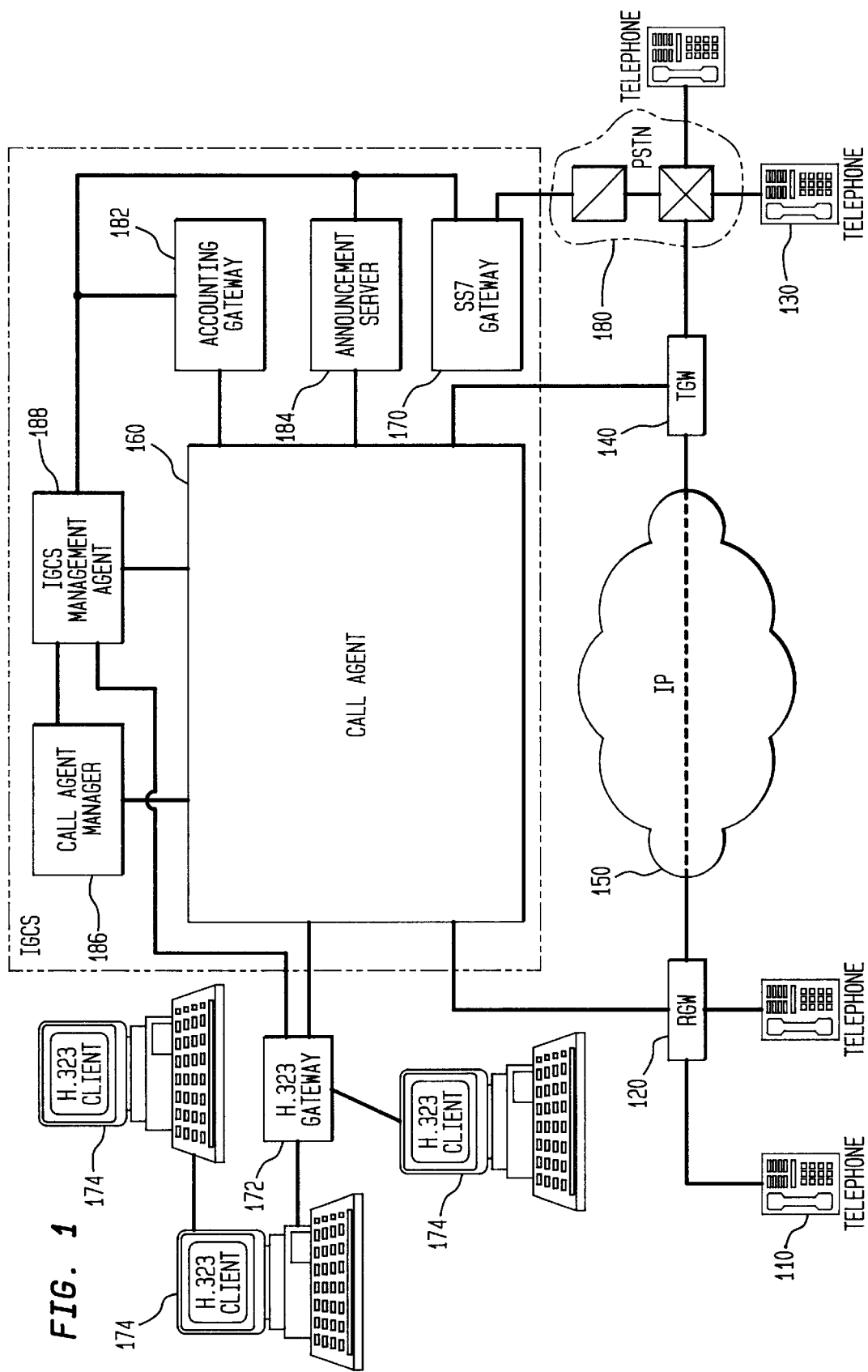
FIG. 1 is a block diagram of the IGCS system according to one embodiment of the invention.

To accommodate various possible future requirements, the IGCS may be divided into separate components, each of which may or may not be present in a particular IGCS deployment. As shown in FIG. 1, these components include a call agent 160, SS7 gateways 170, an accounting gateway 182, and an announcement server 184. The SS7 gateway 170 within a preferred embodiment of the IGCS allows the IGCS to attach to and be part of the existing PSTN while other components within the system may interface with packet-based media devices. In a preferred embodiment of this system, a call agent 160 sets-up a connection between subscriber units 110 and 130 over a network 150. In a preferred embodiment, the subscriber units 110 and 130 are telephones, and the network is an IP network 150. Although, the invention is not limited to this application, and the subscriber units can be any user device for sending and receiving information. Also, the network can be any packet-based network capable of carrying data information, including an ATM network.

Media control devices 120 and 140 each connect a subscriber unit, 110 or 130, respectively, to the network 150. For supporting voice over Internet protocol (VOIP) communications, the media control devices 120 and 140 are termed VOIP gateways and in a preferred embodiment can be either a Trunking Gateway ("TGW") 140 or a residential gateway ("RGW") 120. A TGW 140 connects a Public Switched Telephone Network ("PSTN") 180 to the network 150, and thus provides the subscriber unit 130 with a connection to the network 150.

For this type of connectivity, signaling information, such as call-set up, tear-down, and management signaling, i.e., SS7 signaling, is sent through the PSTN 180 to an SS7 gateway 170, which connects the SS7 signaling information to the call agent 160. The call agent uses this information to set-up, tear-down, or manage the connection by sending messages to the TGW 140. In a preferred embodiment, these messages are Simple Gateway Control Protocol ("SGCP") messages, however, other protocols may be supported depending on the type of media control device the call agent is supporting.

After the call agent 160 sets-up a connection for the subscriber unit 130 over the network 150, information is exchanged between the subscriber units 110 and 130 over the network through their respective gateways 120 and 140. Thus, in a preferred embodiment, the call agent 160 is used for call management and the information exchanged between the subscriber units 110 and 130 does not pass through the call agent 160. In a preferred embodiment, the media control devices use Real Time Protocol ("RTP") and Real Time Control Protocol ("RTCP") to communicate over an IP network.

In another preferred embodiment, the media control devices use an appropriate ATM Adaptation Layer ("ML") type to communicate over an ATM network.

An RGW 120 provides a traditional analog interface to the network. RGWs may include "set-top boxes." Unlike a TGW, RGWs both send and receive signaling information to/from the call agent 160.

In addition, the call agent of a preferred embodiment can communicate with various media control devices controlling various other types of subscriber units. For example, as shown in FIG. 1, an H.323 gateway 172 may be used as a media control device to provide an interface between the call agent and H.323 clients 174.

Figure 2:
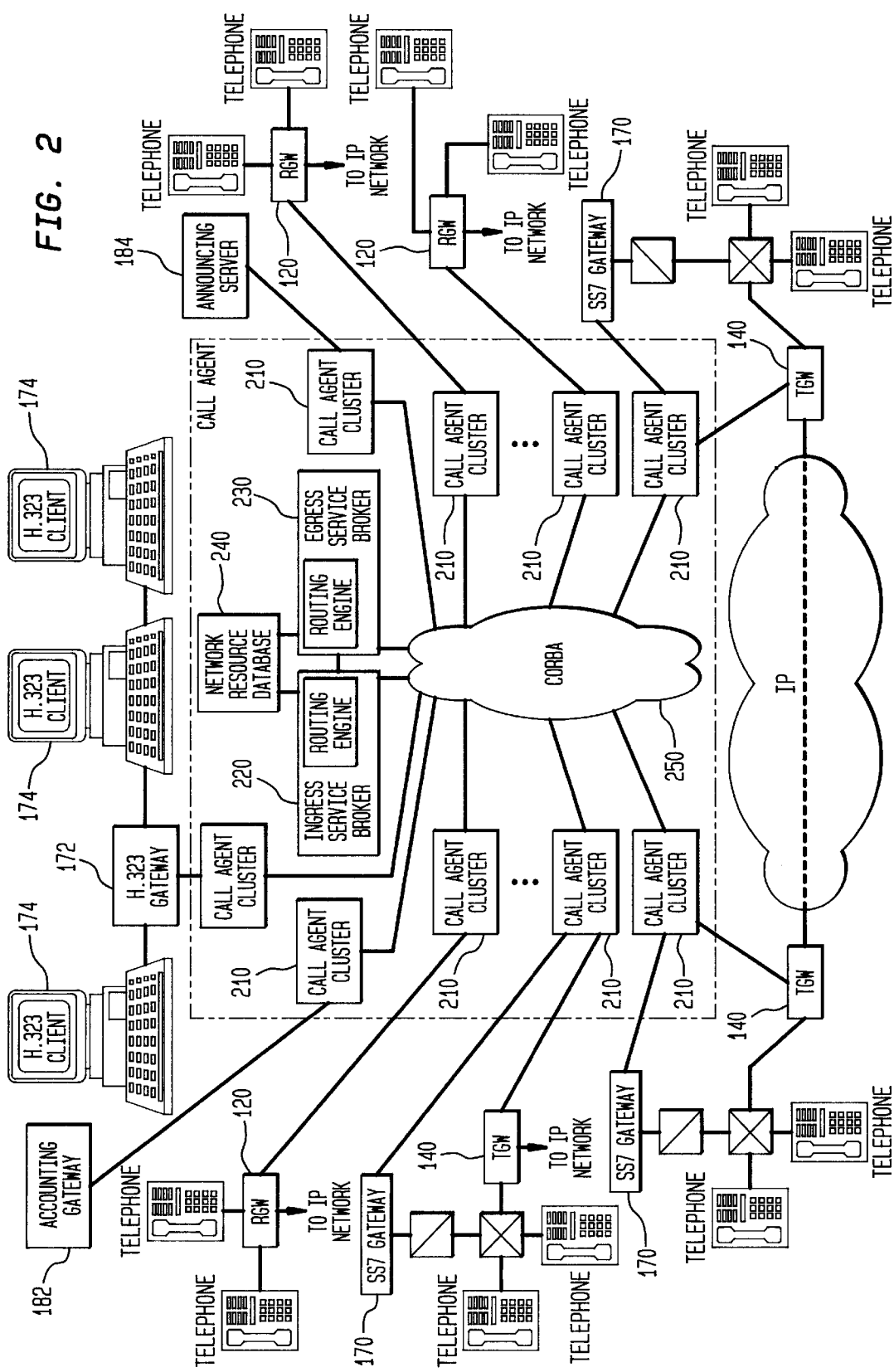
FIG. 2 is a diagram of a call agent according to one embodiment of the invention.

The call agent objects, illustrated in FIG. 2, consist of call agent clusters 210, an ingress service broker 220, an egress service broker 230, and a network resource database 240. These objects are distributed along a Common Object Request Broker Architecture ("CORBA") software bus 250. CORBA allows applications to communicate with one another no matter where they are located or who has designed them, thus allowing for flexible placement of them to suit considerations of cost, performance, and availability.

Call agent clusters are logical groupings of call agent components, and handle the specifics of call management. Their two central functions are exercising control over a media control device, which in a preferred embodiment is a VOIP gateway, and translating messages from one protocol, such as SGCP or ISDN User Part ("ISUP"), into a protocol that is common to all objects within the call agent. In a preferred embodiment, this common protocol is the Multi Call Agent Protocol ("MCAP") developed by Bellcore, which is defined using the CORBA Interface Definition Language ("IDL"). A script for this protocol is provided in Appendix A.

The detailed operation of a call agent cluster varies depending on the type of media control device it manages. The operations of call agent clusters for managing RGWs and TGWs are discussed later.

Figure 3:
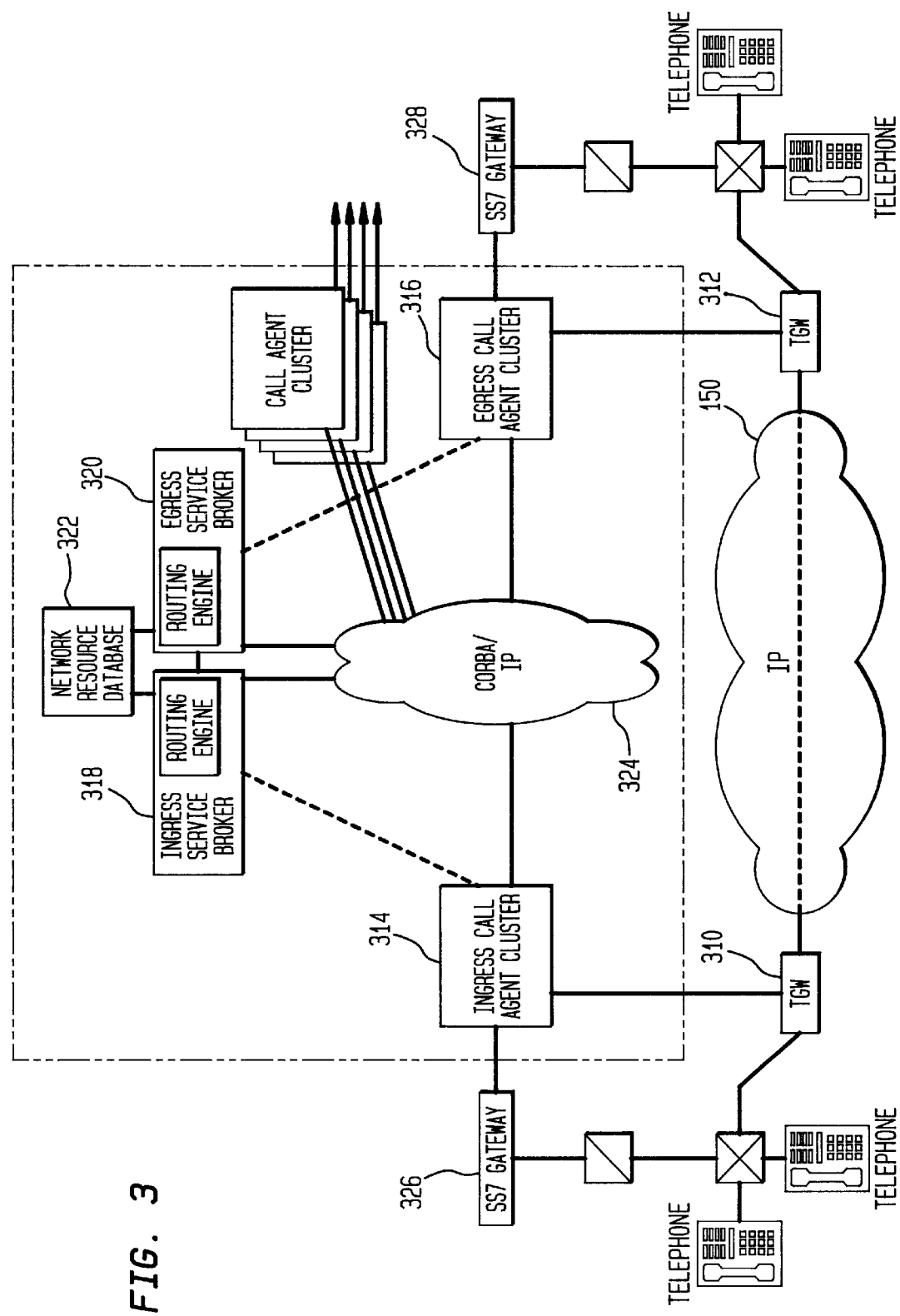
FIG. 3 shows connectivity between two TGWs over a packet-based network according to one embodiment of the invention.
Figure 4:
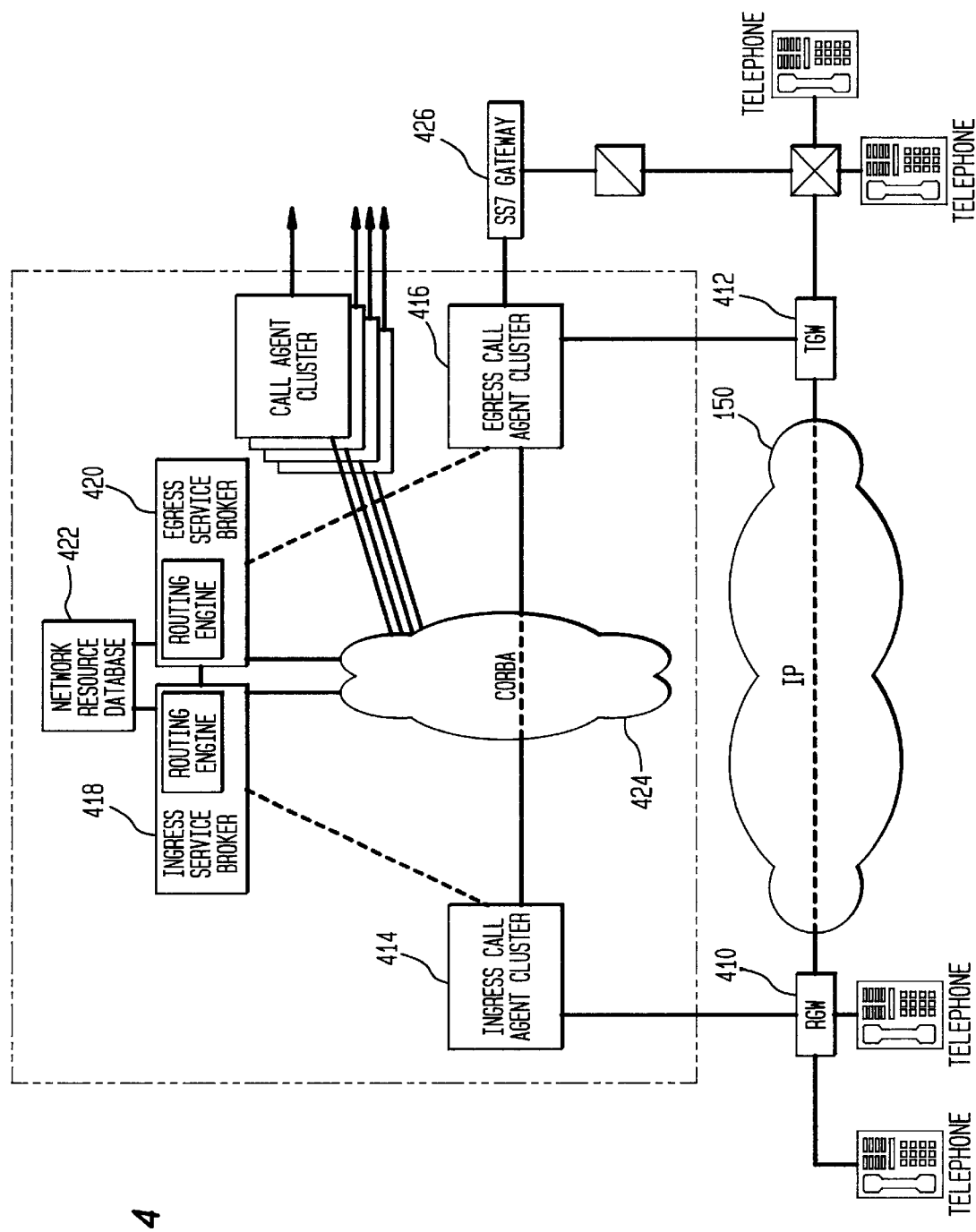
FIG. 4 shows connectivity between a RGW and a TGW over a packet-based network according to one embodiment of the invention.
Figure 5:
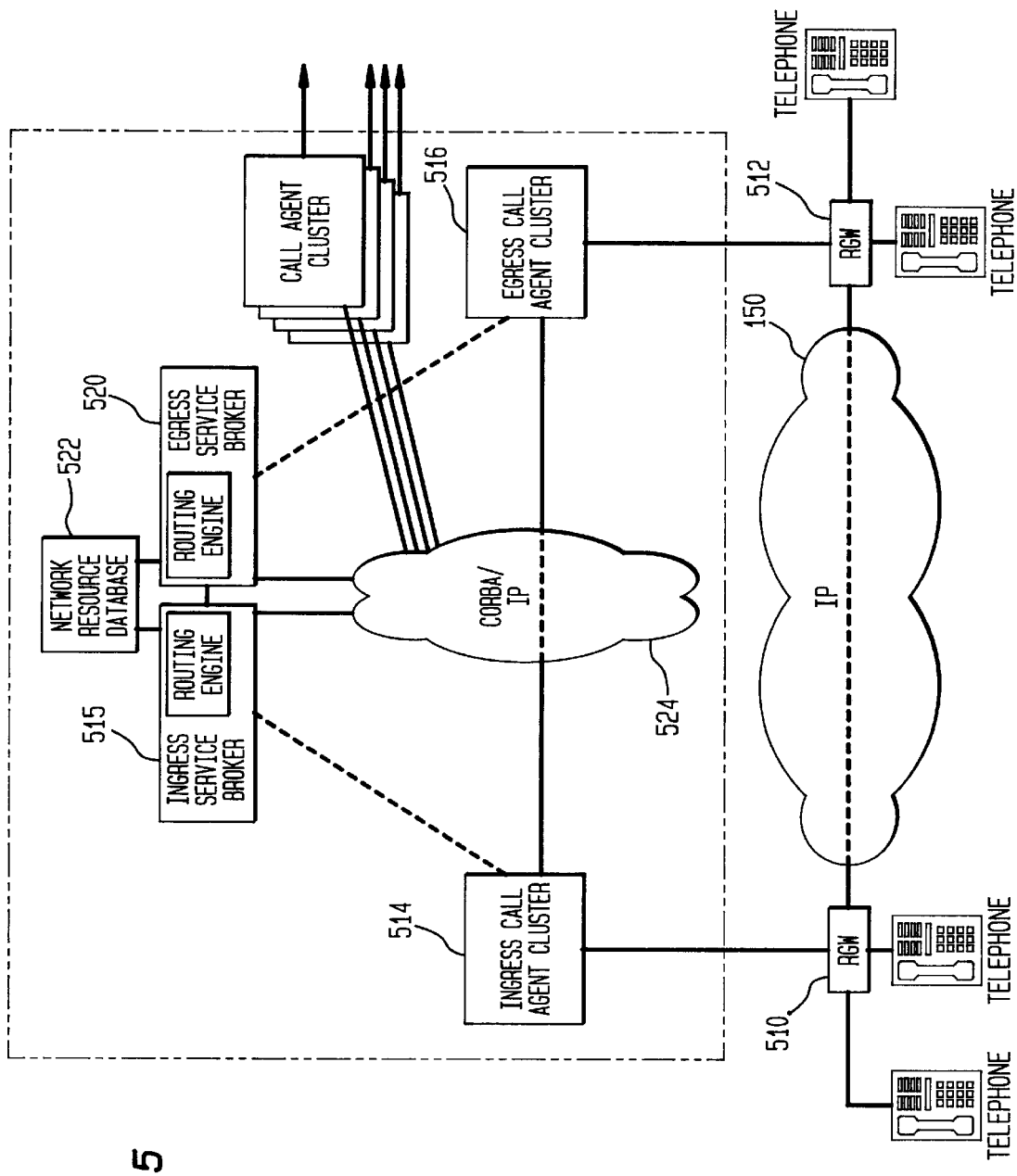
FIG. 5 shows connectivity between two RGWs over a packet-based network according to one embodiment of the invention.

In a preferred embodiment, there are three possible connection types between subscriber units where the subscriber unit is connected to the network via a TGW or RGW. The first connection type is where both subscriber units are connected to the network via a TGW, as illustrated in FIG. 3. The second is where one subscriber unit is connected to the network via an RGW and another is connected to the network via a TGW, as illustrated in FIG. 4. The third connection type is where both subscriber units are connected to the network via RGWs as illustrated in FIG. 5. These figures are discussed in more detail below.

Figure 12:
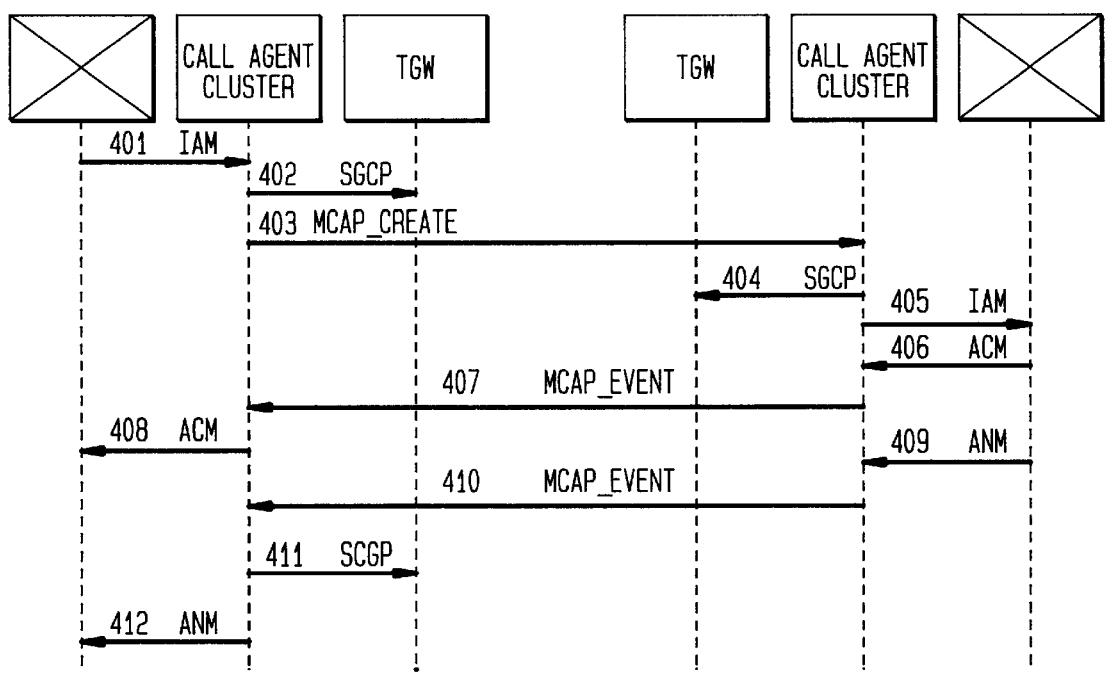
FIG. 12 is a flow diagram for TGW—TGW connection set-up according to one embodiment of the invention.
Figure 13:
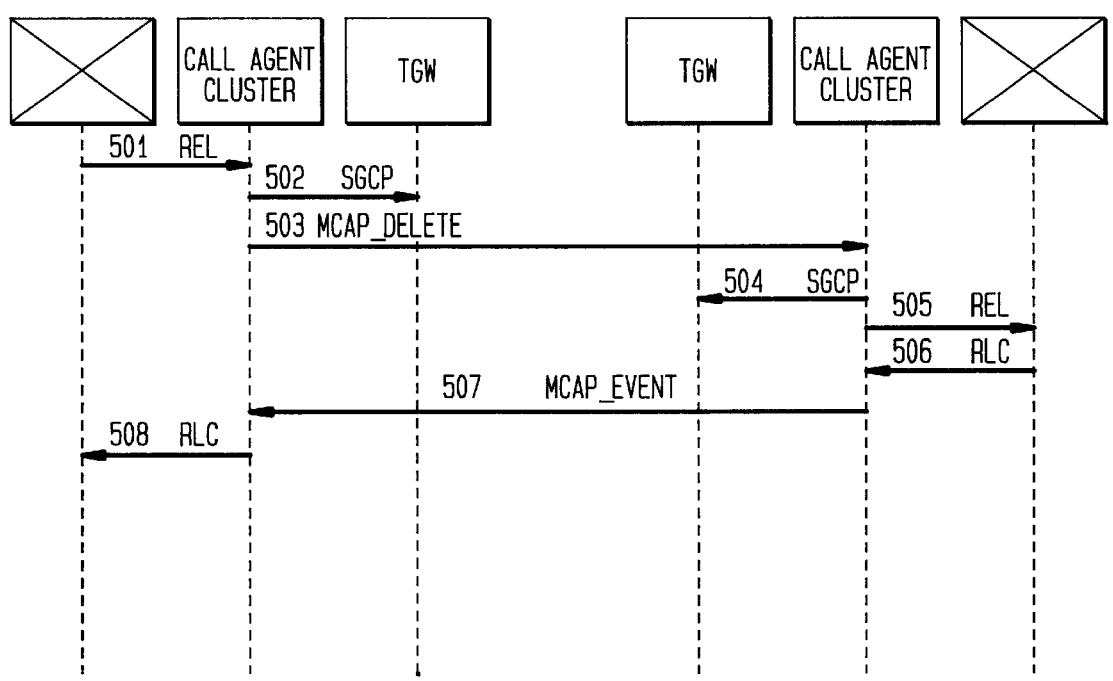
FIG. 13 is a flow diagram for TGW—TGW connection tear down according to one embodiment of the invention.

FIG. 3 illustrates the relevant system components for supporting communications between two subscriber units both connected to the network 150 via a TGW (a TGW-TGW connection). These components preferably include TGWs 310 and 312, an ingress call agent cluster 314, an egress call agent cluster 316, an ingress service broker 318, an egress service broker 320, a network resource database 322, SS7 gateways 326 and 328, and a CORBA software bus 324. Flow diagrams for connection set-up and tear down for this type of connection are shown in FIGS. 12 and 13, respectively, which are discussed later.

Figure 14:
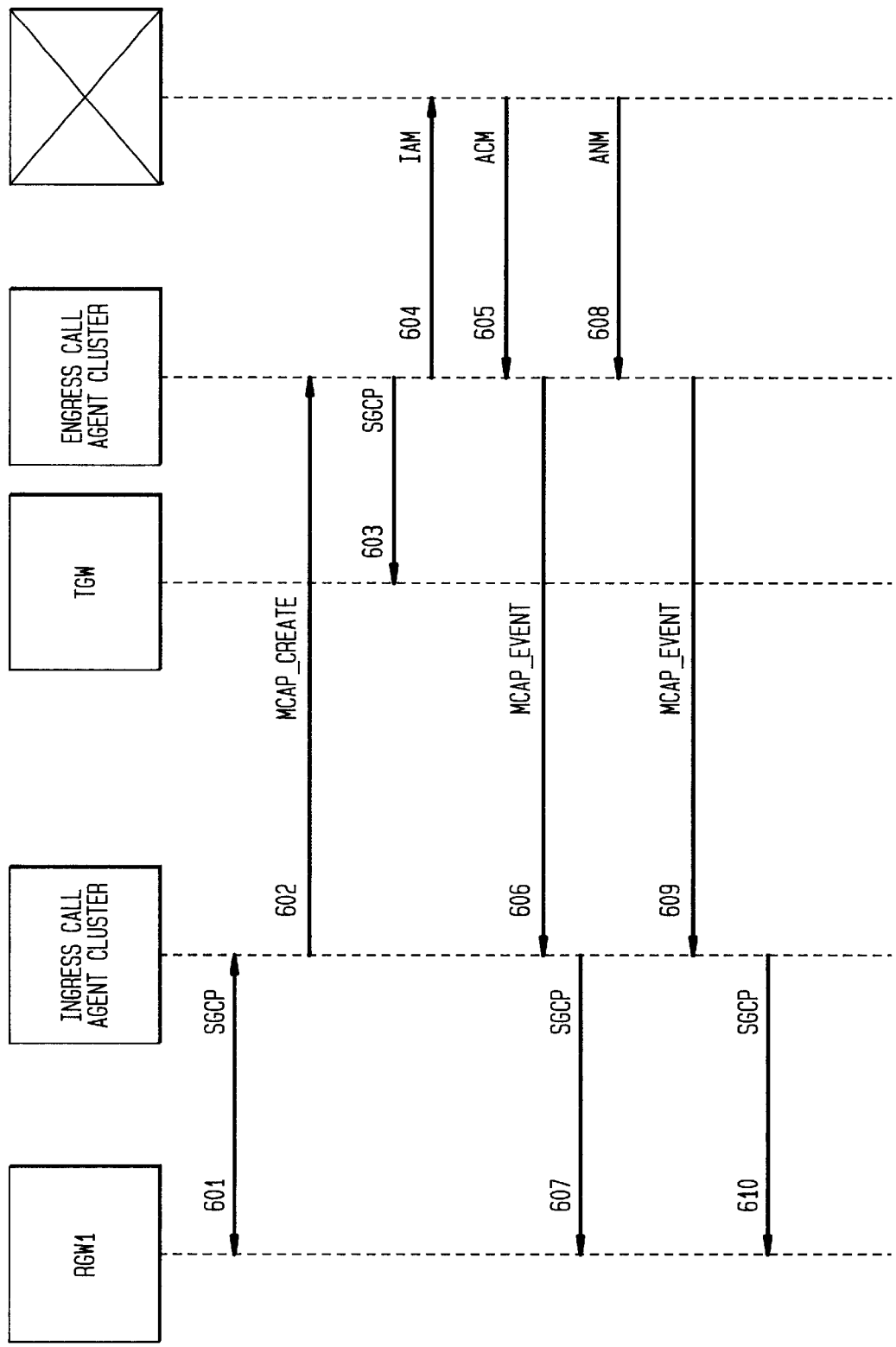
FIG. 14 is a flow diagram for RGW—TGW connection set-up according to one embodiment of the invention.
Figure 15:
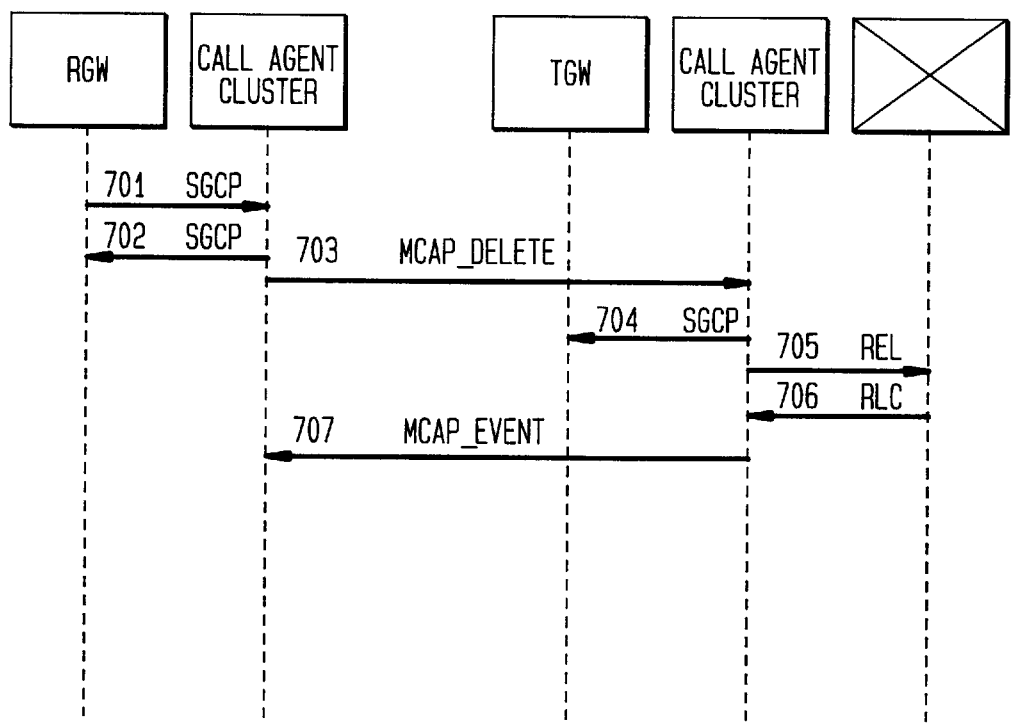
FIG. 15 is a flow diagram for RGW—TGW connection tear down according to one embodiment of the invention.

FIG. 4 illustrates the relevant system components for supporting communications between two subscriber units where one is-connected to the network 150 via an RGW and the other via a TGW. For this embodiment the relevant components include an RGW 410, a TGW 412, an ingress call agent cluster 414, an egress call agent cluster 416, an ingress service broker 418, an egress service broker 420, a network resource database 422, and a CORBA software bus 424. Flow diagrams for connection set-up and tear down for this type of connection are shown in FIGS. 14 and 15, respectively, which are discussed later.

Figure 9:
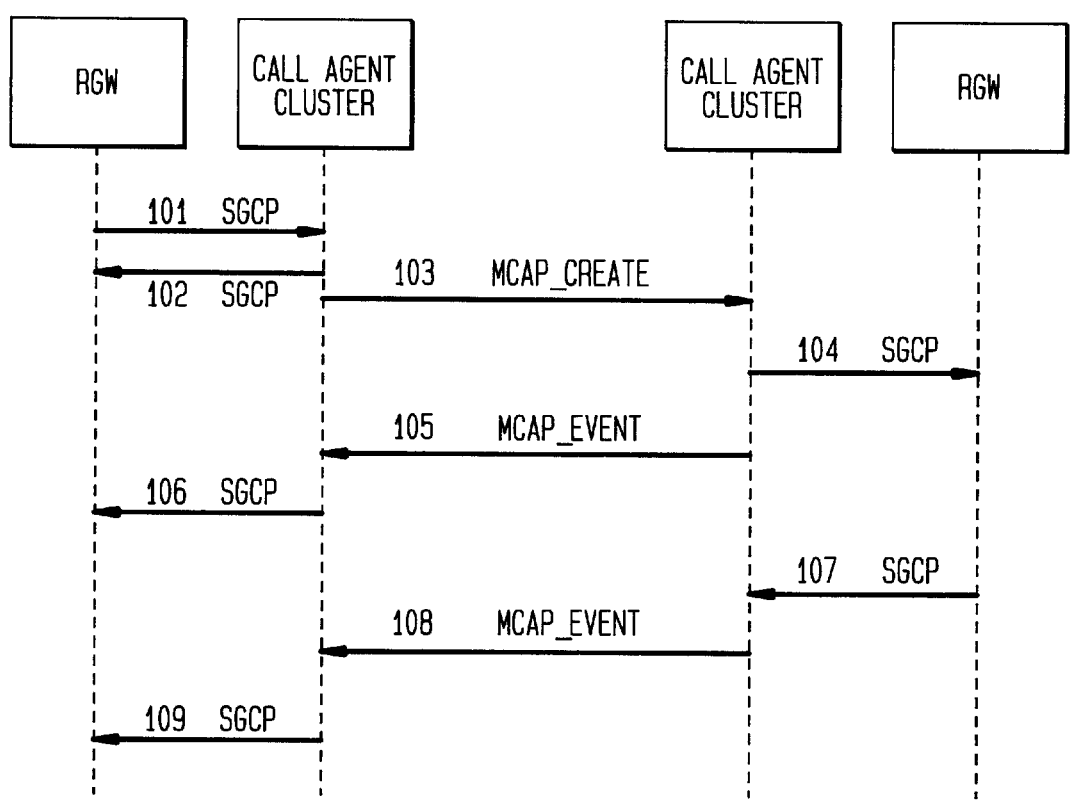
FIG. 9 is a flow diagram for RGW—RGW connection set-up according to one embodiment of the invention.
Figure 11:
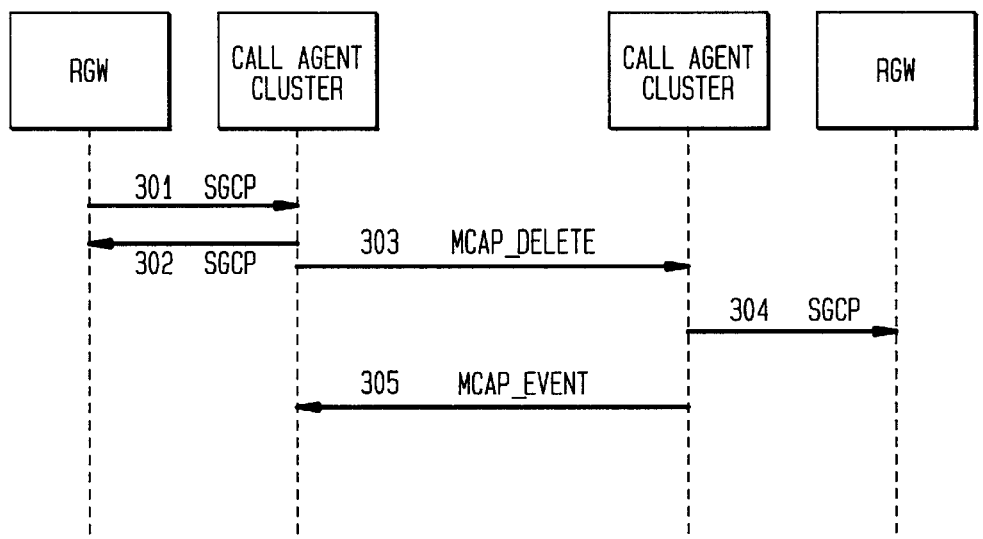
FIG. 11 is a flow diagram for RGW—RGW connection tear down according to one embodiment of the invention.

FIG. 5 illustrates the relevant components where both subscriber units are connected to the 150 network via an RGW. These components preferably include RGWs 510 and 512, an ingress call agent cluster 514, an egress call agent cluster 516, an ingress service broker 518, an egress service broker 520, a network resource database 522, and a CORBA software bus 524. Flow diagrams for connection set-up and tear down for this type of connection are shown in FIGS. 9 and 11, respectively, which are discussed later.

Figure 6:
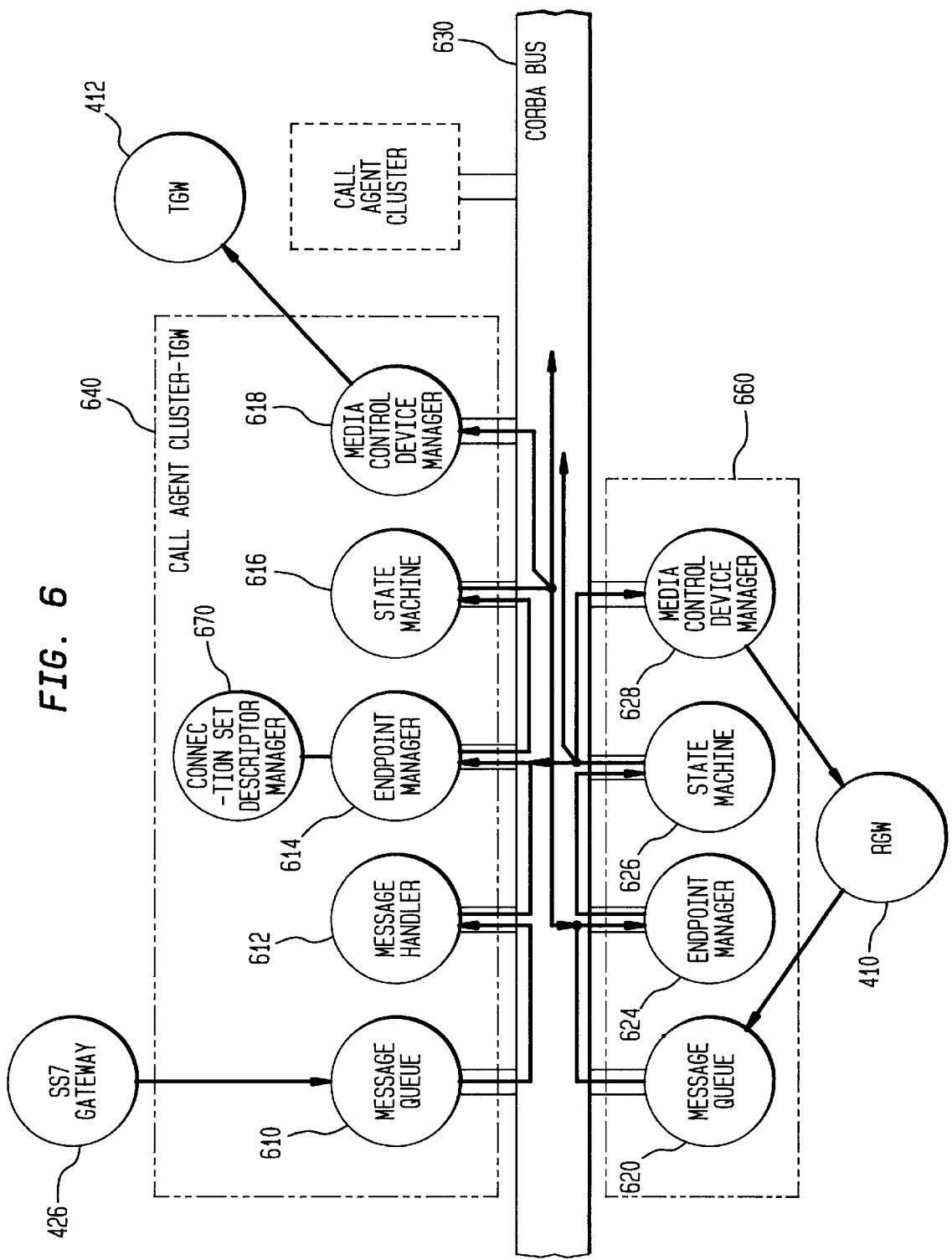
FIG. 6 is a diagram of a call agent cluster for RGW connection management and a call agent cluster for TGW connection management according to one embodiment of the invention.

The objects comprising a call agent cluster vary depending on the type of media control device managed by the cluster. FIG. 6 provides a top level diagram of the objects of a generic call agent cluster for managing a TGW 640 and a call agent cluster for managing an RGW 660. These objects include a message queue 610 and 620, an endpoint manager 614 and 624, a state machine 616 and 626, and a media control device manager 618 and 628. In addition, the call agent cluster may also contain a message handler 612, which is used in TGW connection management. These components are distributed along a CORBA software bus 630.

The message queue 610 and 620 of a call agent cluster temporarily stores messages received from a media control device 426 or 410, respectively. Each call agent cluster preferably contains at least one message queue, and different queues are used for managing different types of media control devices. For example, there are different message queues for RGW and TGW connection management. The message queue for TGW connection management is referred to as an ISUP message queue, and the message queue for RGW connection management is referred to as an SGCP message queue.

The operation of a message queue for TGW connection management consists of an SS7 gateway 426 sending ISUP messages to the queue 610. The queue stores the messages and then forwards them to a message handler 612 on a first in first out basis.

For RGW connection management, an RGW 410 sends SGCP messages to the queue 620. The messages are stored and then transmitted directly to an endpoint manager 624. As such, a call agent cluster for RGW connection management need not contain a message handler.

The endpoint manager 614 and 624 is responsible for managing the state of each call, and each call agent cluster contains at least one. The endpoint manager 614 and 624 has two principal functions. The first is receiving messages from the various components of the system, such as message queues 610 and 620, service brokers 418 and 420 and state machines of peer call agent clusters 616 and 626.

The second principal function of the endpoint manager 614 and 624 is storing information on the state of each connection. The endpoint manager 614 and 624 preferably stores this information in a construct called the connection set descriptor. This construct is sufficiently generic to contain information associated with the various possible types of endpoints, such as TGWs and RGWs. The contents of the connection set descriptor for the preferred embodiment are illustrated in the following table:

| Field | Data | Description |
| --- | --- | --- |
| Source State | Enumeration | An enumeration of states indicating the call source status; e.g. for SS7, a blocked circuit. |
| Connection | Call ID | A unique value used to correlate descriptors between the source and target Call Agents. |
| Source Endpoint | Enumeration | An enumeration of state indicating the call status, e.g., for SS7, waiting for Address Complete Message ("ACM"). |
| | Timestamp | Used by an independent thread within the Endpoint Manager to determine if the allotted time has expired for next state change; e.g. for SS7, the receipt of an ACM in response to sending an Initial Address Message ("IAM"). |
| | Media Control Device Information | Hardware specific source media control device information; e.g., the compression algorithm in use. |
| Target Endpoint | CIC Telephone # Announcement ID | Source ID of target endpoint. |
| | IOR | Target Endpoint Manager Interoperable Object Reference ("IOR"). |
| | Telephone # | Telephone number associated with the target endpoint. |
| | Media Control Device information | Hardware specific target gateway information, e.g., the compression algorithm in use. |

The above summary serves as a guideline that can be specialized for use with specific types of endpoints.

The call agent cluster preferably stores these connection set descriptors in a connection set descriptor manager 670 and 680, an independent object visible only to the endpoint manager. In a preferred embodiment, the storage is in memory with backups written to disk, and there is one connection set descriptor manager per endpoint manager. Although, in other embodiments, there can be one per call agent cluster.

The endpoint manager 614 and 624 upon receiving a message, determines the connection set descriptor associated with the connection, determines the appropriate state machine and then forwards both the connection set descriptor and message to the state machine 616 and 626.

State machines 616 and 626, based on the received message and connection set descriptor, determine an associated action (transition) to take using a call model. The call model used by the state machine 616 and 626 depends upon the type of media control device that the call agent cluster exercises control over. For example, a call agent cluster uses an SGCP ingress/egress call model for RGW connection management, while an ISUP call model would be used for TGW connection management. Appendix B provides a call model script for a preferred embodiment.

Figure 7:
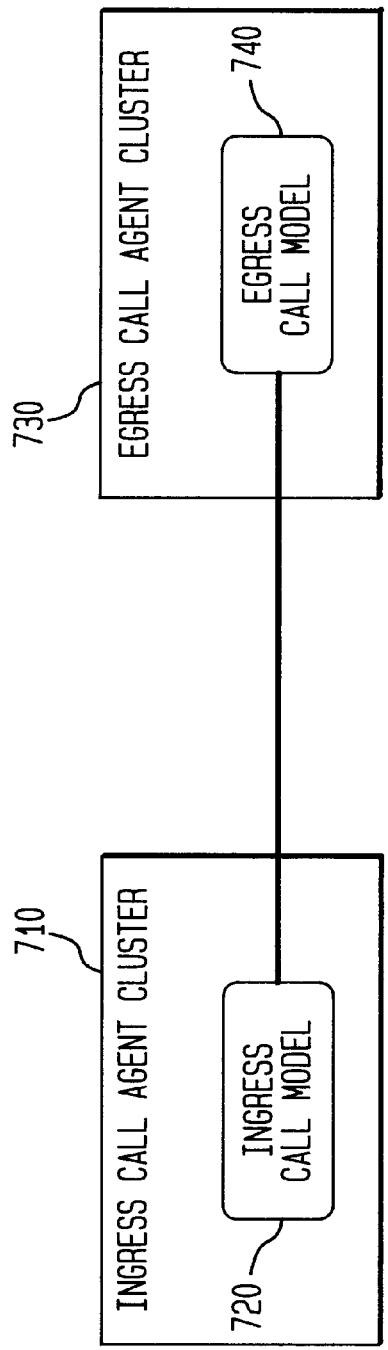
FIG. 7 is a diagram of call models supported by call agent clusters according to one embodiment of the invention.
Figure 8:
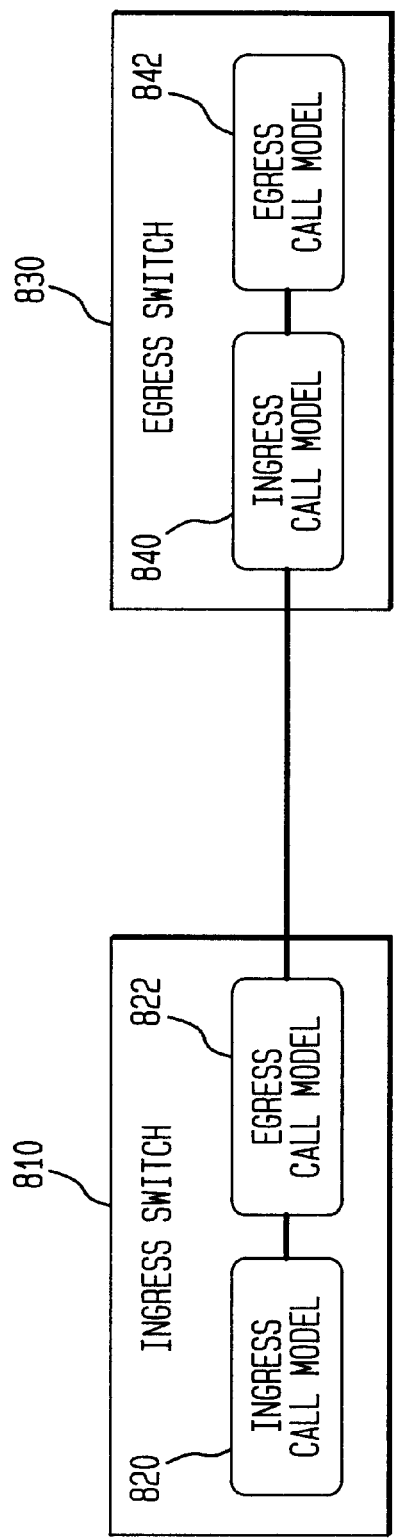
FIG. 8 is a diagram of call models supported by a traditional switch.

As shown in FIG. 7, each call agent cluster preferably supports a half call model on either the ingress or egress side of the call. That is, the ingress call agent cluster 710 supports an ingress call model 720, and the egress call agent cluster 730 supports an egress call model 740. In contrast, as shown in FIG. 8, in traditional telephony, both the ingress switch 810 and egress switch 830 support both an ingress call model 820 and 840 and an egress call model 822 and 842, respectively.

After the action is determined, it is taken. This action can involve a sequence of interactions and include transmitting messages to a gateway manager 618 and 628, service broker 418, or an endpoint manager of a peer call agent cluster 614 and 624. In a preferred embodiment, these messages are transmitted over a CORBA software bus using the MCAP protocol.

The state machine can be described as "stateless," meaning that the state machine has no independent knowledge of the state of a connection. It preferably receives this information from the endpoint manager as part of the connection set descriptor. This permits an endpoint manager to work with a number of different state machines over the course of a connection for management purposes. In addition, it permits the endpoint manager to work with the state machines of different network service providers that may perform unique functions.

The media control device manager 618 and 628 preferably interacts with the state machine 616 and 626 to manage the respective media control device. It accomplishes this by receiving MCAP messages from the state manager 616 and 626, translating them to the appropriate protocol, and transmitting SGCP messages to the respective media control device 410 or 412, respectively.

In addition to the above components, the call agent cluster may also contain a message handler. This component is preferably used for TGW connection management, and there is no counterpart for RGW connection management. The principal function of the message handler is determining which of a plurality of endpoint managers should service the call. Thus, the message handler receives an ISUP message from the message queue, determines which endpoint manager should receive the message, and forwards the message to this endpoint manager.

From an Object Oriented ("OO") perspective, the implementation of similar objects, e.g. the RGW and TGW Message Queues, are candidates for inheritance, meaning the objects inherent to the call agent cluster are designed to be generic in structure and can be reused for handling different protocols. In this way, the implementation can take advantage of the benefits gained from identifying common behavior and design patterns.

FIG. 9 provides a flow diagram for describing the operation of the call agent for setting up a connection between end-users connected to the network via RGWs, such as illustrated in FIG. 5. The process is initialized by the RGW (Step 101). The ingress call agent cluster and the RGW then exchange several messages (Step 102). These messages may include messages to play a dial-tone, collect digits, and enter receive mode. The ingress call agent cluster then sends an MCAP message to the egress call agent cluster regarding setting up a connection between the call agent clusters (Step 103). The internal operations of the call agent clusters are discussed later.

The egress call agent cluster then instructs, using SGCP, the RGW to setup a connection in send/receive mode and start a ringing signal in the subscriber unit (Step 104). After which, the egress call agent cluster sends an MCAP message to the ingress call agent cluster indicating that it created a connection (Step 105). The ingress call agent cluster then instructs, using SGCP, the RGW to start a ringing tone in the subscriber unit (Step 106). When the call is answered, the RGW sends an off-hook message to the egress call agent cluster (Step 107), which is forwarded, using MCAP, to the ingress call agent cluster (Step 108). After which, the ingress call agent cluster, using SGCP, instructs the RGW to enter send/receive mode (Step 109).

Figure 10:
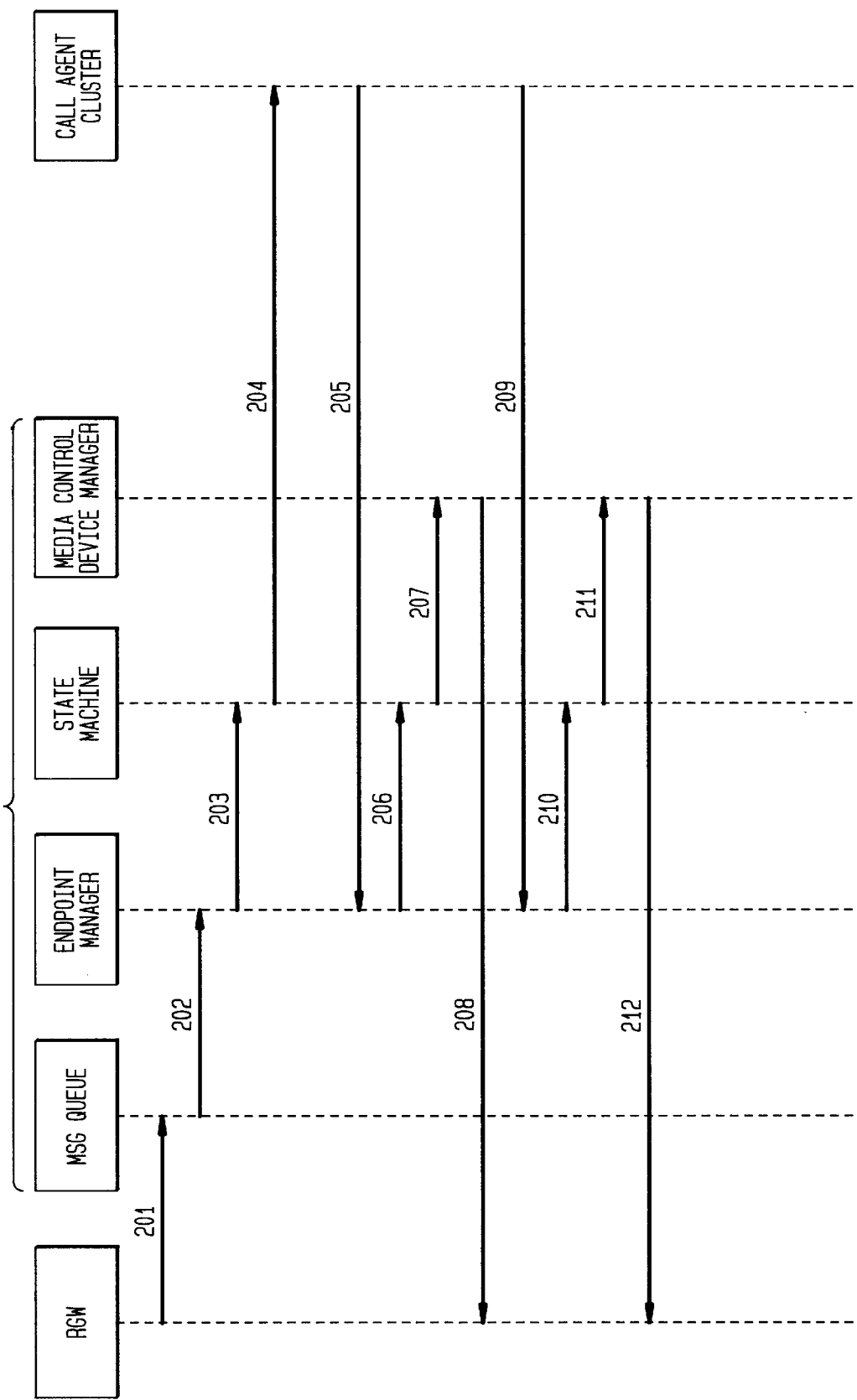
FIG. 10 is a flow diagram for the call agent cluster supporting RGW—RGW connectivity according to one embodiment of the invention.

FIG. 10, provides a more detailed flow diagram for describing the internal operations of the ingress call agent cluster for the above described RGW to RGW connection set-up. An RGW sends an SGCP message to the message queue of the ingress call agent cluster indicating that it wishes to establish a connection with a second media control device (Step 201). This message is placed in the queue.

The message is then passed to the endpoint manager (Step 202) on a first in first out of the queue basis. The endpoint manager then transmits the connection set descriptor and message to the state machine (Step 203).

The state machine then uses the received message and connection set descriptor to take a specified action, determined by the applicable call model. In this case, the specified action is sending an MCAP message to the endpoint manager of the egress call agent cluster (Step 204). It should be noted that a service broker is used to establish the connection between call agent clusters; the operations of this process are discussed later.

The state machine of the egress call agent cluster then sends an MCAP message to the endpoint manager of the ingress call agent cluster indicating that it set-up a connection with the RGW (Step 205). The endpoint manager forwards this message and the connection set descriptor to the state machine (Step 206). The state machine determines which action to take using this received information and the applicable call model. In this case, the state machine sends an MCAP message to the gateway manager instructing it to instruct the RGW gateway to start ringing (Step 207). After which, the gateway manager sends an SGCP message to the RGW to start ringing (Step 208).

When the call is answered, the state machine of the egress call agent cluster sends a message to the endpoint manager of the ingress call agent cluster indicating that the phone on the egress side is off-hook (Step 209). The endpoint manager then forwards this message along with the associated connection set descriptor to the state machine (Step 210).

The state machine then determines the action to take using this received information. In this case, the state machine transmits an MCAP message to the gateway manager indicating that the phone has been answered (Step 211). The gateway manager then forwards, using SGCP, this message to the RGW (Step 212).

In a preferred embodiment, call agent cluster objects may be shadowed. For example, a call agent cluster can contain an idle second state machine for use in the event the first state machine fails. Because a CORBA bus is used in the preferred embodiment and state machines are stateless, this second state machine need not share the same hardware environment as the primary object.

FIG. 11 provides a flow diagram for tearing down a connection between RGWs. The process is initialized when an RGW sends an on-hook message to the ingress call agent cluster (Step 301), which is received by the message queue of the call agent cluster and forwarded to the state machine via the endpoint manager. The ingress call agent cluster then instructs the RGW to tear down the connection (Step 302). After which, the ingress call agent cluster sends an MCAP message to the egress call agent cluster (Step 303), which instructs, using SGCP, its RGW to tear down the connection (Step 304). The egress call agent cluster then sends a message to the ingress call agent cluster indicating that the above action was taken (Step 305).

FIG. 12 provides a flow diagram for setting up a TGW to TGW connection. The process is initialized by a switch sending an Initial Address Message ("IAM") message to the ingress call agent cluster indicating it wishes to establish a media session between two subscriber units (Step 401). The ingress call agent cluster then instructs, using SGCP, the TGW on the ingress side to set up a connection in receive mode. (Step 402) The ingress call agent then forwards an MCAP message indicating this information to the egress call agent cluster (Step 403). After which, the egress call agent cluster instructs, using SGCP, the TGW to set-up a connection in send/receive mode (Step 404). The egress call agent cluster then sends an IAM message to the switch (Step 405). After which, the switch sends an Address Complete Message ("ACM") to the egress call agent cluster (Step 406). The egress call agent cluster then sends an MCAP message to the ingress call agent cluster indicating that it took the requested action (Step 407). The ingress call agent cluster then sends an ACM to the switch (Step 408). After which, the switch sends an Answer Message ("ANM") to the egress call agent cluster (Step 409). The egress call agent cluster then sends an MCAP message to the ingress call agent cluster indicating that the call has been answered (Step 410). After which, the ingress call agent cluster instructs the TGW to enter send/receive mode (Step 411). The ingress call agent cluster then sends an ANM message to the switch (Step 412).

FIG. 13 provides a flow diagram for tearing down a TGW to TGW connection. The process is initialized by a switch sending a Release Message ("REL") to the ingress call agent cluster (Step 501). The ingress call agent cluster then instructs the TGW to tear down the connection (Step 502). After which, the ingress call agent cluster sends an MCAP message to the egress call agent cluster (Step 503). The egress call agent cluster then instructs the TGW to tear down the connection (Step 504). The egress call agent cluster then sends an REL to the switch (Step 505). The switch then sends a Release Confirm ("RLC") to the egress call agent cluster (Step 506). The egress call agent cluster sends an MCAP message to the ingress call agent cluster indicating that the connection has been released (Step 507). After which, the ingress call agent cluster sends an RLC message to the switch.

FIG. 14, provides a flow diagram for setting-up a connection between an RGW and a TGW. The process is initialized by the RGW and ingress call agent cluster exchanging several SGCP messages relating to setting up a connection. (Step 601). These messages include messages related to playing a dial-tone, collecting digits and entering receive mode. The ingress call agent cluster then sends an MCAP message to the egress call agent cluster indicating it wishes to set-up a media session (Step 602). The egress call agent cluster then instructs the TGW to set up a connection in send/receive mode (Step 603). After which, the egress call agent cluster constructs an IAM and sends it to the switch (Step 604). The switch then sends an ACM to the egress call agent cluster (Step 605). The egress call agent cluster then sends an MCAP message to the ingress call agent cluster indicating that it took the above action (Step 606). The ingress call agent cluster then instructs the RGW to start a ringing tone (Step 607). The switch then sends an ANM to the egress call agent cluster (Step 608). After which, the egress call agent cluster sends an MCAP message indicating that the call was answered to the ingress call agent cluster (Step 609). The ingress call agent cluster then instructs the RGW to enter send/receive mode (Step 610).

FIG. 15 provides a flow diagram for tearing down an RGW to TGW connection. The RGW initializes the process by sending an on-hook message to the ingress call agent cluster (Step 701), which instructs the RGW to tear down the connection (Step 702). The ingress call agent cluster then sends an MCAP message to the egress call agent cluster instructing it to tear down the connection (Step 703). After which, the egress call agent cluster instructs the TGW to tear down the connection by sending it an SGCP message (Step 704). The egress call agent cluster then constructs a REL and sends it to the switch (Step 705). After which, the switch sends an RLC to the egress call agent cluster (Step 706). The egress call agent cluster then sends an MCAP message to the ingress call agent cluster indicating that the connection has been released (Step 707).

Figure 16:
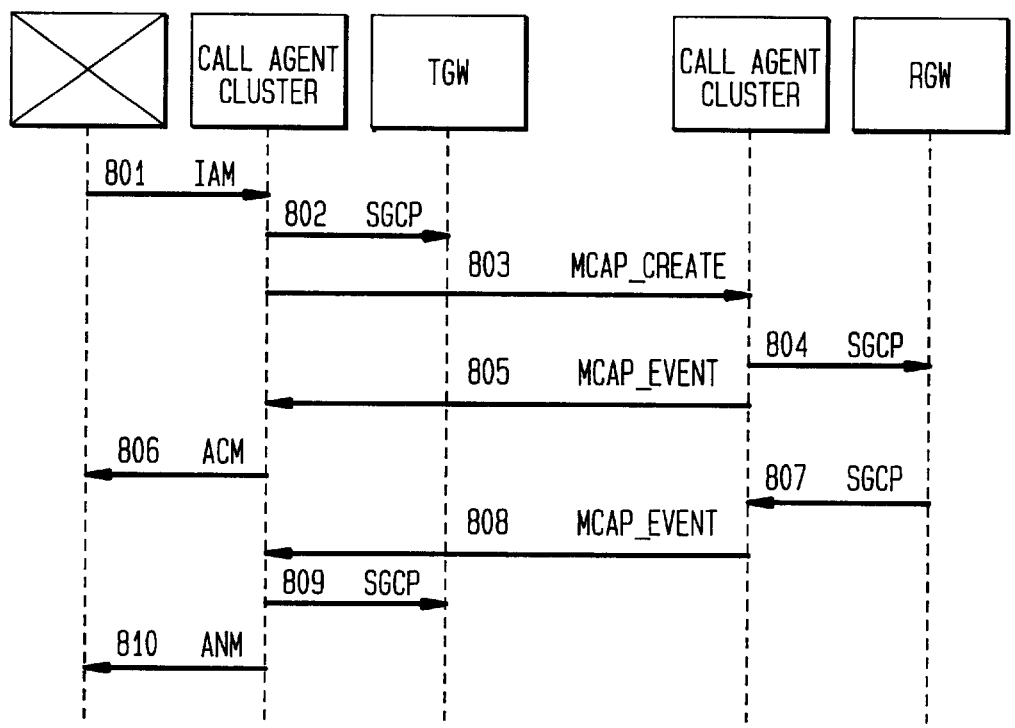
FIG. 16 is a flow diagram for TGW—RGW connection set-up according to one embodiment of the invention.

FIG. 16 provides a flow diagram for setting up a TGW to RGW connection. The switch initializes the process by sending an IAM to the ingress call agent cluster (Step 801). After which, the ingress call agent cluster instructs the TGW to set-up a connection in receive mode (Step 802). The ingress call agent cluster then sends an MCAP message to the egress call agent cluster regarding establishing a connection (Step 803). The egress call agent cluster then instructs the RGW to setup a connection in send/receive mode and start a ringing signal (Step 804). After which, the egress call agent cluster sends an MCAP message to the ingress call agent cluster indicating that it took the above action (Step 805). The egress call agent cluster then constructs an ACM and sends it to the switch (Step 806). The RGW then sends an off-hook message to the egress call agent cluster (Step 807). The egress call agent cluster then sends an MCAP message to the ingress call agent cluster indicating that the call was answered. (Step 808). The ingress call agent cluster then instructs the TGW to enter send/receive mode (Step 809). After which, the ingress call agent cluster constructs an ANM and sends it to the switch (Step 810).

Figure 17:
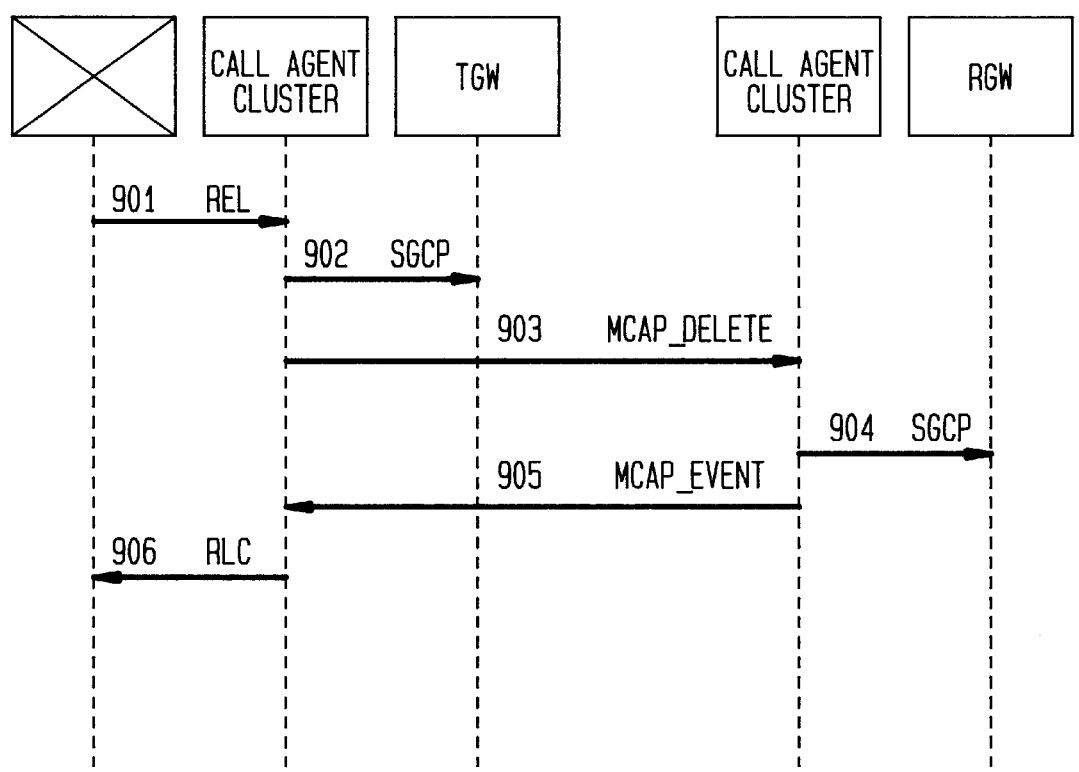
FIG. 17 is a flow diagram for TGW—RGW tear down according to one embodiment of the invention.

FIG. 17, provides a flow diagram for tearing down a TGW to RGW connection. The switch initializes the process by sending a REL to the ingress call agent cluster (Step 901). The ingress call agent cluster then instructs the TGW to tear down the connection (Step 902). The ingress call agent cluster then sends an MCAP message to the egress call agent cluster indicating that the connection is to be torn down. (Step 903). The egress call agent cluster then instructs the TGW to tear down the connection (Step 904). The egress call agent cluster then sends an MCAP message to the ingress call agent cluster indicating that the connection was released (Step 905). After which, the ingress call agent cluster constructs an RLC and sends it to the switch (Step 906).

The call agent uses a service broker for establishing communications between an ingress and egress call agent cluster. When a subscriber unit wishes to establish communications with another subscriber unit, the ingress call agent cluster forwards the information to an ingress service broker. The ingress service broker performs an algorithm for determining the egress service broker for the egress call agent cluster of the subscriber unit it wishes to establish communications with. The egress service broker then performs an algorithm for determining the appropriate egress call agent cluster. The service brokers use routing engines for performing these algorithms, which use a routing table, a look-up table, for determining the appropriate information. In addition, the routing performs the functions of digit translation and classifying the connection (e.g., is it a 800 call or long distance call).

In a preferred embodiment, the proper execution of the routing engine is assured by, during initialization, loading into a table in a high speed database the egress call agent cluster's endpoint manager's Interoperable Object Reference ("IOR"). In a preferred embodiment, the table points to a relationship between a given endpoint manager's IOR and a route path for a media session. The routing engine consults with this table and, depending on the number dialed, selects the appropriated endpoint manager's IOR and routes MCAP messages to it to establish a connection.

Figure 18:
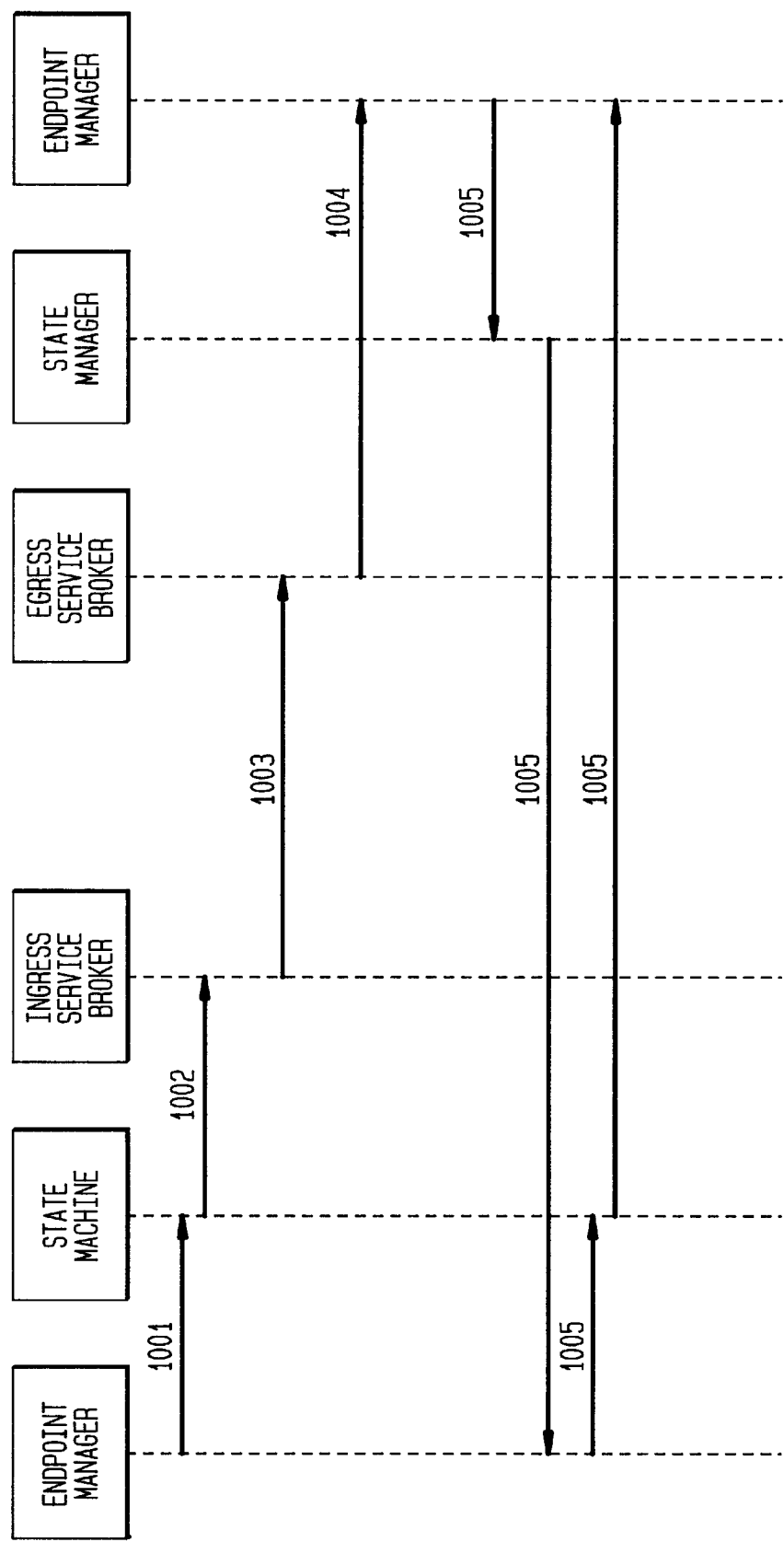
FIG. 18 is a flow diagram of a service broker for connection set-up according to one embodiment of the invention.

FIG. 18 provides a flow diagram for this process. Once a call agent cluster receives a request from a subscriber unit to establish communications with a second subscriber unit, the message is forwarded from an endpoint manager to the state machine, as discussed above (Step 1001). The state machine then forwards this request using MCAP to the ingress service broker (Step 1002). The ingress service broker, using a routing engine, determines the appropriate egress service broker and forwards the request to it using MCAP (Step 1003). The egress service broker then, using a routing engine, determines the appropriate egress call agent cluster and, using MCAP, forwards the message to its endpoint manager (Step 1004). After which, the ingress and egress call agent clusters communicate directly with one another (Step 1005).

In a preferred embodiment, a network resource data base stores information regarding the network. This network resource database is coupled to the CORBA bus. As such, the service brokers and call agent clusters can access this database.

In addition to the above described call agent and SS7 gateways, the IGCS may include a call agent manager 186, accounting gateway 182 announcement server 184, and an IGCS management agent 188.

The accounting gateway 182 in a preferred embodiment is a media control device by which start/stop call records are disseminated to a central point where they are translated from CORBA into Remote Authentication Dial-In User Service ("RADIUS"), then translated into industry standard BAF records for distribution to back-end billing systems. As shown in FIG. 2, the accounting gateway 182, in a preferred embodiment, communicates with a call agent cluster 210 of a call agent 160.

In a preferred embodiment, the announcement server 184 is a media control device which responds to SGCP messages by playing recorded announcements. As shown in FIG. 2, the announcement server communicates with a call agent cluster 210 of a call agent 160.

The call agent manager 186 is directly responsible for the local management of the call agent, for example: displaying the state of the call agent components, displaying alarms reported by the call agent components and object control, such as shutdown.

The IGCS management agent 188 of a preferred embodiment manages all IGCS components including the call agent clusters, network resource database, accounting gateway and announcement server.

In a preferred embodiment, the overall network management software is capable of displaying usage statistics accumulated in the call agent clusters. A call agent of a preferred embodiment is designed to be Simple Network Management Protocol ("SNMP") manageable by any third party SNMP management software, e.g., HP open view. The architecture allows for SNMP sets, gets, and traps to be sent to a call agent SNMP agent whose function is the gathering of statistics via CORBA method invocations executed against call agent cluster objects. Also, SNMP sets are handled via method invocations that update data in the call agent cluster.

While it has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

What is claimed is:

1. A communication system for providing local and long distance telephone service over a packet based network to telephone subscribers connected to circuit switched switching offices, said system comprising
   a plurality of gateways including trunk gateways connecting the packet based network to individual ones of the switching offices, residential gateways connected to subscriber telephones, and SS7 gateways connected to individual ones of the switching offices,
   and a service control system including
      a plurality of call agent clusters, each of said gateways being connected to one of said call agent clusters, one of said call agent clusters serving as an ingress call agent cluster and another of said call agent clusters serving as an egress call agent cluster for a specific communication to be set up through the packet based network between a calling and a called telephone subscriber, and a software bus interconnecting the ingress call agent cluster receiving information from the calling subscriber and the egress call agent cluster associated with the called subscriber, said egress call agent cluster communicating to the gateway element associated with the called subscriber for establishing the connection over the packet based network.

2. The communication system in accordance with claim 1 wherein said service control system further comprises a routing engine for determining the appropriate egress call agent cluster for the communication desired to be established between the calling and called subscribers.

3. The communication system in accordance with claim 2 wherein one of said gateways is an accounting gateway.

4. The communication system in accordance with claim 2 wherein said SS7 gateways are connected to individual ones of the switching offices.

5. The communication system in accordance with claim 1 wherein said call agent clusters each include a packet network message queue, an endpoint manager, a state machine, and a media control device manager.

6. The communication system in accordance with claim 5 wherein each call agent cluster connected to a trunk gateway further includes a message handler and a connection set descriptor manager and said media control device manager is connected to the trunk gateway.

7. The communication system in accordance with claim 6 wherein said packet network message queue of each said call agent cluster connected to a trunk gateway is connected to an SS7 gateway, said SS7 gateway serving to control the establishment of a communication path through a switching office and the trunk gateway serving to complete the communication path from the packet based network through the switching office to the called subscriber.

8. The communication system in accordance with claim 5 wherein in each call agent cluster connected to a residential gateway said media control device manager is connected to said residential gateway.

9. The communication system in accordance with claim 8 wherein in each call agent cluster connected to a residential gateway said packet network message queue is connected to said residential gateway.

10. The communication system in accordance with claim 1 further comprising an announcing server connected to one of said call agent clusters.

11. A method for establishing communication for local and long distance telephone service over a packet based network between a calling and a called subscriber connected to circuit switched switching systems, the calling and called subscribers being connected to a service control system by gateways and said service control system including a plurality of call agent clusters, and said method comprising the steps of:

transmitting information from a calling subscriber through a gateway to a first call agent cluster, said information regarding establishing a communication with a called subscriber;

setting up a connection in said service control system between said first call agent cluster and a called agent cluster associated with the calling subscriber, said setting up the connection comprising the first call agent cluster transmitting information to a routing engine and the routing engine determining a second call agent cluster associated with the called subscriber from the plurality of called agent clusters in the service control system and transmitting the information to the determined second call agent cluster; and thereafter exchanging communication over the packet network between the calling and called subscribers.

12. The method according to claim 11 wherein said step of the routing engine determining the second call agent cluster includes the steps of the routing engine transmitting a request to a network resource database and the network resource database responding back to the routing engine.

* * * * *